United States Patent
Wu et al.

(10) Patent No.: US 10,530,701 B2
(45) Date of Patent: Jan. 7, 2020

(54) RUDP APPARATUS AND DYNAMIC ADJUSTMENT METHOD OF SLIDING WINDOW PARAMETER

(71) Applicant: Acer Incorporated, New Taipei (TW)

(72) Inventors: Yi-Sheng Wu, New Taipei (TW); Yuan-Hsiu Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/124,161

(22) Filed: Sep. 6, 2018

(65) Prior Publication Data
US 2019/0075057 A1 Mar. 7, 2019

(30) Foreign Application Priority Data
Sep. 7, 2017 (TW) .............................. 106130691 A

(51) Int. Cl.
*H04L 12/807* (2013.01)
*H04L 29/12* (2006.01)
*H04L 12/801* (2013.01)
*H04L 29/06* (2006.01)

(52) U.S. Cl.
CPC .............. *H04L 47/27* (2013.01); *H04L 47/12* (2013.01); *H04L 61/256* (2013.01); *H04L 69/16* (2013.01)

(58) Field of Classification Search
CPC ....... H04L 47/12; H04L 47/27; H04L 61/256; H04L 69/16
See application file for complete search history.

(56) References Cited

U.S. PATENT DOCUMENTS

| | | | | |
|---|---|---|---|---|
| 6,088,330 | A | * | 7/2000 | Bruck ................. G06F 11/1076 370/228 |
| 2005/0088972 | A1 | | 4/2005 | Zhang et al. |
| 2009/0279429 | A1 | * | 11/2009 | Griffoul ............ H04L 29/08846 370/230 |
| 2011/0131654 | A1 | * | 6/2011 | Taneja ................ H04L 63/1416 726/23 |
| 2016/0113031 | A1 | * | 4/2016 | Sun ........................ H04W 28/26 370/336 |

FOREIGN PATENT DOCUMENTS

| | | |
|---|---|---|
| CN | 103067301 | 4/2013 |
| TW | I530147 | 4/2016 |

OTHER PUBLICATIONS

Bova et al; "Reliable UDP Protocol", Network Working Group Internet Draft, Feb 25, 1999 (Year: 1999).*
Dunberg, Albert; "Evaluation of Reliable Network Communication Solutions in an Industrial Environment", 2007 (Year: 2007).*
Thammadi, Abhilash; "Reliable User Datagram Protocol (RUDP)", 2011 (Year: 2011).*

* cited by examiner

*Primary Examiner* — Gary Mui
(74) *Attorney, Agent, or Firm* — JCIPRNET

(57) ABSTRACT

A Reliable User Datagram Protocol (RUDP) apparatus and a dynamic adjustment method of a sliding window parameter of RUDP are provided. The dynamic adjustment method of the sliding window parameter of RUDP includes the following steps. In accordance with whether the acknowledgement from the receiver is overtime, and in accordance with the difference between the sliding window parameter and an estimated maximum value, the transmitter adjusts a step value. The transmitter adjusts the sliding window parameter according to the step value.

22 Claims, 2 Drawing Sheets

RUDP APPARATUS AND DYNAMIC ADJUSTMENT METHOD OF SLIDING WINDOW PARAMETER

CROSS-REFERENCE TO RELATED APPLICATION

This application claims the priority benefit of Taiwan application serial no. 106130691, filed on Sep. 7, 2017. The entirety of the above-mentioned patent application is hereby incorporated by reference herein and made a part of this specification.

BACKGROUND OF THE INVENTION

1. Field of the Invention

The invention relates to a network communication technology, and more particularly, to a RUDP apparatus and a dynamic adjustment method of a sliding window parameter.

2. Description of Related Art

In general, Local Area Network (LAN) is connected to the Internet via Network Address Translator (hereinafter referred to as NAT). NAT may be a firewall device, a router, an internetwork protocol (IP) sharer, a network bridge or other devices capable of providing a network address translating function. NAT allows various devices in LAN to share the same Internet address so these devices can be connected to the Internet. In such a network environment, when an external device intends to access an internal device in LAN via the Internet by using Internet address, the external device can conduct a data transmission via peer to peer (hereinafter referred to as P2P) mechanism provided by NAT, namely, to punch through NAT devices. To be able to "punch through the NAT devices", a hole punching technique is required.

The exiting hole punching technique includes Transport Control Protocol (hereinafter referred to as TCP) hole punching technique and User Datagram Protocol (hereinafter referred to as UDP) hole punching technique, but these two ways have their own advantages and disadvantages. TCP hole punching technique has an excellent data transmission reliability (which is not prone to a data packet loss), and yet a hole punching success rate of TCP hole punching technique is considerably low. A hole punching success rate of UDP hole punching technique is considerably high, but UDP hole punching technique has a high data packet loss rate, which leads an unreliable data transmission.

Currently, UDP hole punching technique is used by most of P2P transmission. To overcome the issue of data packet loss, Reliable User Datagram Protocol (Reliable UDP; hereinafter referred to as RUDP) is used in P2P transmission to solve such issue. RUDP has a sliding window parameter for determining how much data can be handled by RUDP at the same time. A transmitter determines how much data (e.g., how many physical layer packets) in one batch is to be outputted to a communication network (e.g., the Internet) under control of the sliding window parameter. In the conventional art, the sliding window parameter is, however, a fixed value. The sliding window parameter cannot automatically and dynamically be adjusted in response to changes in the network environment. In an environment with very large network bandwidth, if the sliding window parameter is set too small, RUDP is unable to effectively use the network bandwidth (low transmission rate). In an environment with very small network bandwidth, if the sliding window parameter is set too large, RUDP is then prone to the data packet loss.

Major reasons causing the network transmission rate to drop at least include the following three factors. The first factor is that, when a data packet is lost, whether or not the lost data packet can be re-sent in a short period of time. The transmission rate will be affected if a reaction of the detection mechanism is too slow, or too quick. The network bandwidth cannot be effectively used if the reaction is too slow, and the same data may be sent multiple times if the reaction is too quick. The second factor is that, whether the network bandwidth can be effectively used during the data transmission. During the data transmission, the transmitter will not be aware of conditions of the network bandwidth on a transmission path between the transmitter and a receiver. In other words, the transmitter will not know of the place where a transmission bottleneck takes place in the transmission path. For instance, when an uploading volume (uploading bandwidth) of the transmitter is greater than a downloading volume (downloading bandwidth) of the receiver, the receiver may not be able to receive data in time no matter how much data is transmitted by the transmitter, resulting in a network congestion. The third factor is that, whether the network congestion is handled properly. When the network congestion occurs, it means that the network environment (the transmission path between the transmitter and the receiver) is currently unable to handle too many data packets. If the network congestion is not handled properly, the data packet loss rate will be increased and the same data will be re-sent multiple times, resulting in an inefficient data transmission. In view of aforesaid factors, "whether the network bandwidth can be effectively used" is the key for deciding whether RUDP is able to provide a favorable transmission rate.

SUMMARY OF THE INVENTION

The invention is directed to a Reliable User Datagram Protocol (RUDP) apparatus and a dynamic adjustment method of a sliding window parameter of RUDP for effectively using the network bandwidth.

An embodiment of the invention provides a dynamic adjustment method of a sliding window parameter of RUDP. The dynamic adjustment method of the sliding window parameter of RUDP includes: correspondingly adjusting a step value by a transmitter in accordance with whether an acknowledgment (ACK) from a receiver is overtime, and in accordance with a difference between the sliding window parameter and an estimated maximum value; and adjusting the sliding window parameter according to the step value.

An embodiment of the invention provides a RUDP apparatus. The RUDP apparatus includes a transmitting unit, a receiving unit and an adjusting unit. The transmitting unit is configured to receive to-be-transmitted data from an application program interface. Based on RUDP, the transmitter outputs the to-be-transmitted in batches to a communication network according to a sliding window parameter. The receiving unit is configured to receive an ACK or a negative acknowledgment (NAK) from a receiver via the communication network. The adjusting unit is coupled to the transmitting unit to set the sliding window parameter. The adjusting unit is coupled to the receiving unit to obtain the ACK and/or the NAK. The adjusting unit correspondingly adjusts a step value in accordance with whether the ACK is overtime and in accordance with a difference between the sliding window parameter and an estimated maximum value. The adjusting unit adjusts the sliding window parameter according to the step value.

Based on the above, according to the RIDP apparatus and the dynamic adjustment method of the sliding window parameter of RUDP described in various embodiments of the invention, the sliding window parameter of RUDP is dynamically adjusted in accordance with whether the ACK is overtime so the sliding window parameter can adapt the current network environment. As a result, the RUDP apparatus and the dynamic adjustment method of the sliding window parameter are capable of effectively using the network bandwidth.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
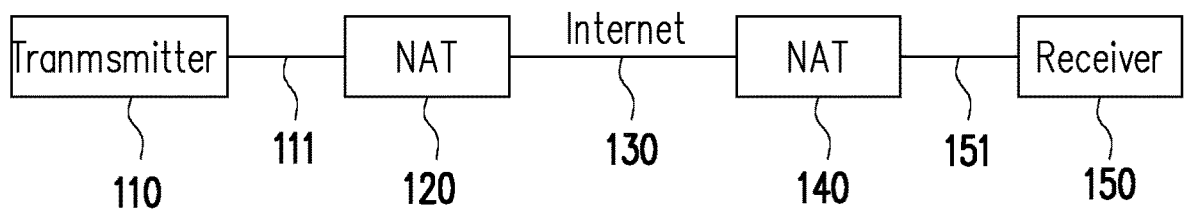
FIG. 1 is a circuit block diagram illustrating a connection established between a transmitter and a receiver via the Internet.

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, elements/components/steps with same reference numerals represent same or similar parts in the drawings and embodiments. Elements/components/steps with the same reference numerals or names in different embodiments may be cross-referenced.

FIG. 1 is a circuit block diagram illustrating a connection established between a transmitter and a receiver via the Internet. A transmitter 110 is connected to a net address translator (NAT) 120 via a local area network (LAN) 111. The transmitter 110 may be a computer, a smart phone, or other communication devices. The NAT 120 may be a firewall device, a router, an internetwork protocol (IP) sharer, a network bridge or other devices capable of providing a network address translation function. The NAT 120 allows various devices (e.g., the transmitter 110) in the LAN 111 to share the same Internet address so these devices in the LAN 111 can be connected to an Internet 130. Similarly, a receiver 150 is connected to a NAT 140 via a LAN 151. The receiver 150 may be a computer, a smart phone, or other communication devices. The NAT 140 may be derived from related description for the NAT 120, which is not repeated hereinafter. The transmitter 110 can establish a connection with the receiver 150 by using RUDP via the LAN 111, the NAT 120, the Internet 130, the NAT 140 and the LAN 151.

Based on RUDP, the transmitter 110 outputs to-be-transmitted data in batches to the LAN 111 according to a sliding window parameter C. In general, data in one batch contains a plurality of physical layer packets. Data of each batch arrives at the receiver 150 via a communication network (the LAN 111, the NAT 120, the Internet 130, the NAT 140 and the LAN 151). After the packet is received by the receiver 150, the receiver 150 sends an acknowledgment (hereinafter referred to as ACK) back to the transmitter 110 to indicate a successful reception. When the receiver 150 finds that a specific expected packet is not received, the receiver 150 can actively sends a negative acknowledgment (hereinafter referred to as NAK) back to the transmitter 110 to indicate that a packet is lost.

After the physical layer packet is sent out by the transmitter 110, the transmitter 110 can then receive the ACK or the NAK from the receiver 150 via the communication network. If the ACK arrives at the transmitter 110 without becoming overtime (the ACK from the receiver 150 is received by the transmitter 110 within a rated time), it means that the physical layer packet is successfully sent to the receiver 150 (successful transmission). If the ACK is overtime (the ACK from the receiver 150 is not received by the transmitter 110 within the rated time), it means that the physical layer packet is lost (failed transmission). If the NAK from the receiver 150 is received by the transmitter 110, it means that the physical layer packet is lost (failed transmission).

In general, a network bandwidth applied by the user is fixed, but the network bandwidths applied by different users may not be the same. Moreover, the same network may be shared by many people, making the network bandwidth unpredictable. To effectively use the current network bandwidth, the following embodiments will discuss a dynamic adjustment method of a sliding window parameter of RUDP, by which a dynamic control can be performed based on the current network bandwidth and usage so the network bandwidth can be effectively used. The dynamic adjustment method of the sliding window parameter adopts Fuzzy Rules so the network bandwidth can be properly used. Fuzzy Rules are used to dynamically determine a size of a sliding window according to the current network environment so as to efficiently use the current network bandwidth.

Figure 2:
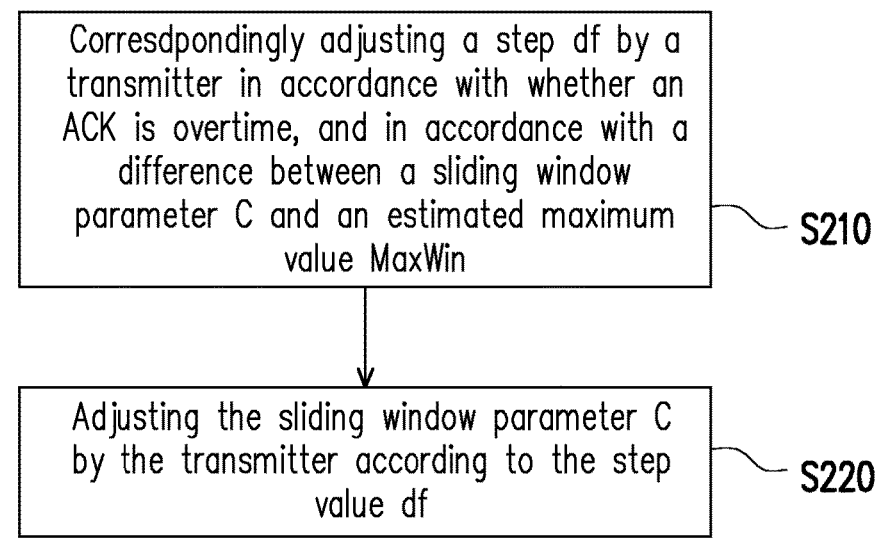
FIG. 2 is a flowchart illustrating a dynamic adjustment method of a sliding window parameter of RUDP according to embodiments of the invention.

FIG. 2 is a flowchart illustrating a dynamic adjustment method of a sliding window parameter of RUDP according to embodiments of the invention. The following refers to FIG. 1 and FIG. 2. In step S210, in accordance with whether the ACK from the receiver 150 is overtime, and in accordance with a difference between the sliding window parameter C and an estimated maximum value MaxWin, the transmitter 110 can adjust a step value df. Detailed implementation of step 210 is not particularly limited by the present embodiment. For instance, in some embodiments, step S210 includes Algorithm 1 below. In Algorithm 1, values in a first range are less than values in a second range, and a first step value is less than a second step value.

Algorithm 1:
When the ACK received by the transmitter is not overtime, and the difference between the sliding window parameter C and the estimated maximum value MaxWin falls within the first range,
    adjusting the step value df to the first step value; and when the ACK received by the transmitter is not overtime, and the difference between the sliding window parameter C and the estimated maximum value MaxWin falls within the second range, adjusting the step value df to the second step value.

In some other embodiments, step S210 includes Algorithm 2 below. In Algorithm 2, values in a first range are less than values in a second range; the values in the second range are less than values in a third range; the values in the third range are less than values in a fourth range; the values in the fourth range are less than values in a fifth range; the values in the fourth range are less than values in a sixth range. The first range, the second range, the third range, the fourth range, the fifth range and the sixth range may be determined based on design requirements. For instance (but not limited thereto), the first range may be 0 to 1; the second range may be 1 to 2; the third range may be 2 to 3; the fourth range may be 3 to 4; the fifth range may be 4 to 5; and the sixth range may be 5 to 6.

Algorithm 2:
IF the ACK is received in time AND the sliding window parameter C is equal to the estimated maximum value MaxWin
 THEN adjust the step value df to a first step value
IF the ACK is received in time AND the difference between the sliding window parameter C and the estimated maximum value MaxWin falls within the first range
 THEN adjust the step value df to a first step value
IF the ACK is received in time AND the difference between the sliding window parameter C and the estimated maximum value MaxWin falls within the second range
 THEN adjust the step value df to a second step value
IF the ACK is received in time AND the difference between the sliding window parameter C and the estimated maximum value MaxWin falls within the third range
 THEN adjust the step value df to a third step value
IF the ACK is received in time AND the difference between the sliding window parameter C and the estimated maximum value MaxWin falls within the fourth range
 THEN adjust the step value df to a fourth step value
IF the ACK is received in time AND the difference between the sliding window parameter C and the estimated maximum value MaxWin falls within the fifth range
 THEN adjust the step value df to a fifth step value
IF the ACK is received in time AND the difference between the sliding window parameter C and the estimated maximum value MaxWin falls within the sixth range
 THEN adjust the step value df to a sixth step value In Algorithm 2 above, the first step value is less than the second step value; the second step value is less than the third step value; the third step value is less than the fourth step value; the fourth step value is less than the fifth step value; the fifth step value is less than the sixth step value. The first step value, the second step value, the third step value, the fourth step value, the fifth step value and the sixth step value may be determined based on design requirements. For instance (but not limited thereto), the first step value may be 0.1; the second step value may be 0.5; the third step value may be 1; the fourth step value may be 2; the fifth step value may be 3; and the sixth step value may be 4.

In an initializing operation of the transmitter 110, the transmitter 110 can initialize the step value df, the sliding window parameter C and the estimated maximum value MaxWin, so as to set the step value df to an initial step value (e.g., 0.1 or other real values), set the sliding window parameter C initial to an initial sliding window value (e.g., 1 or other real values), and set the estimated maximum value MaxWin to an initial estimated value (e.g., 12 or other real values). The initial step value, the initial sliding window value and the initial estimated value may be determined based on design requirements.

In step S220, the transmitter 110 can adjust the sliding window parameter C according to the step value df. For instance, in some embodiments, the transmitter 110 can calculate a sum of a window value C' and the step value df and uses the sum as the window value C', that is, C'=C'+df. The transmitter 110 can determine the sliding window parameter C according to the window value C'. For instance, in some embodiments, the transmitter 110 can take an integer part of the window value C' as the sliding window parameter C. In some other embodiments, the transmitter 110 can calculate a product of the window value C' and a specific scale value (real number), and then uses such product as the sliding window parameter C.

In some embodiments, in step S220, the transmitter 110 can also perform Algorithm 3 below. In Algorithm 3, a preset value is in response to the estimated maximum value MaxWin. For instance, in some embodiments, the preset value may be a product of the estimated maximum value MaxWin and a specific ratio. The ratio may be determined based on design requirements. For instance, the ratio may be 1/2 or other real numbers. Based on design requirements, the initial sliding window value in Algorithm 3 may be 1 or other real numbers.

Algorithm 3:
When the ACK received by the transmitter is not overtime, and the sliding window parameter C is the initial sliding window value,
 adjusting the sliding window parameter C to the preset value In some embodiments, in step S220, the transmitter 110 can also determine whether to update the estimated maximum value MaxWin. For example, when one specific packet is lost (e.g., when the NAK from the receiver 150 is received by the transmitter 110, or the ACK is overtime and yet still not received by the transmitter 110), the transmitter 110 can determine whether to update the estimated maximum value MaxWin to the sliding window parameter C and determine whether to set the sliding window parameter C to the initial sliding window value according to a relation between the sliding window parameter C and the estimated maximum value MaxWin. For instance, when the ACK is overtime and yet still not received by the transmitter 110 or the NAK from the receiver 150 is received by the transmitter 110, the transmitter 100 can perform "an estimated value updating operation". The estimated value updating operation includes: when the sliding window parameter C is greater than the estimated maximum value MaxWin, updating the estimated maximum value MaxWin to the sliding window parameter C and setting the sliding window parameter C to the initial sliding window value. That is to say, in step S220, the transmitter 110 can perform Algorithm 4 below, so as to determine whether to update the estimated maximum value MaxWin. Based on design requirements, the initial sliding window value in Algorithm 4 may be 1 or other real numbers.

Algorithm 4:
IF the NAK is received or the ACK is overtime THEN
 IF C is greater than MaxWin THEN
 update MaxWin to the sliding window parameter C
 set the sliding window parameter C to the initial sliding window value For instance, when the estimated maximum value MaxWin is less than the number of packets that can be handled by the current network bandwidth, the estimated maximum value MaxWin may be dynamically increased so the estimated maximum value MaxWin can approach the current network environment. When the sliding window parameter C is less than the estimated maximum value MaxWin, the sliding window parameter C may be dynamically increased so the sliding window parameter C can immediately follow the estimated maximum value MaxWin. If the number of packets that can be handled by the current network bandwidth is less than the sliding window parameter C, the NAK sent back from the receiver 150 will be received by the transmitter 110 or the expected ACK will be overtime and yet still not received by the transmitter 110, namely, a packet loss occurs. When the packet loss occurs, the transmitter 110 can use the current sliding window parameter C as the estimated maximum value MaxWin, and set the window value C' to an initial value (e.g., 1). Accordingly, in the case of the network congestion, the transmitter 110 can re-send the packet that needs to be re-sent once again to the receiver 150 first, and avoid sending new packets to the communication network. In the case where the sliding window parameter C is the initial value (e.g., 1), if the ACK is received in time, the transmitter 110 can set the window value C' to one half (or other scale value) of the estimated maximum value MaxWin so as to accelerate a speed of the window value C' for following the estimated maximum value MaxWin. Accordingly, the sliding window parameter C of RUDP can be dynamically adjusted to adapt the current network environment. In this way, the RUDP apparatus and the dynamic adjustment method of the sliding window parameter are capable of effectively using the network bandwidth.

Figure 3:
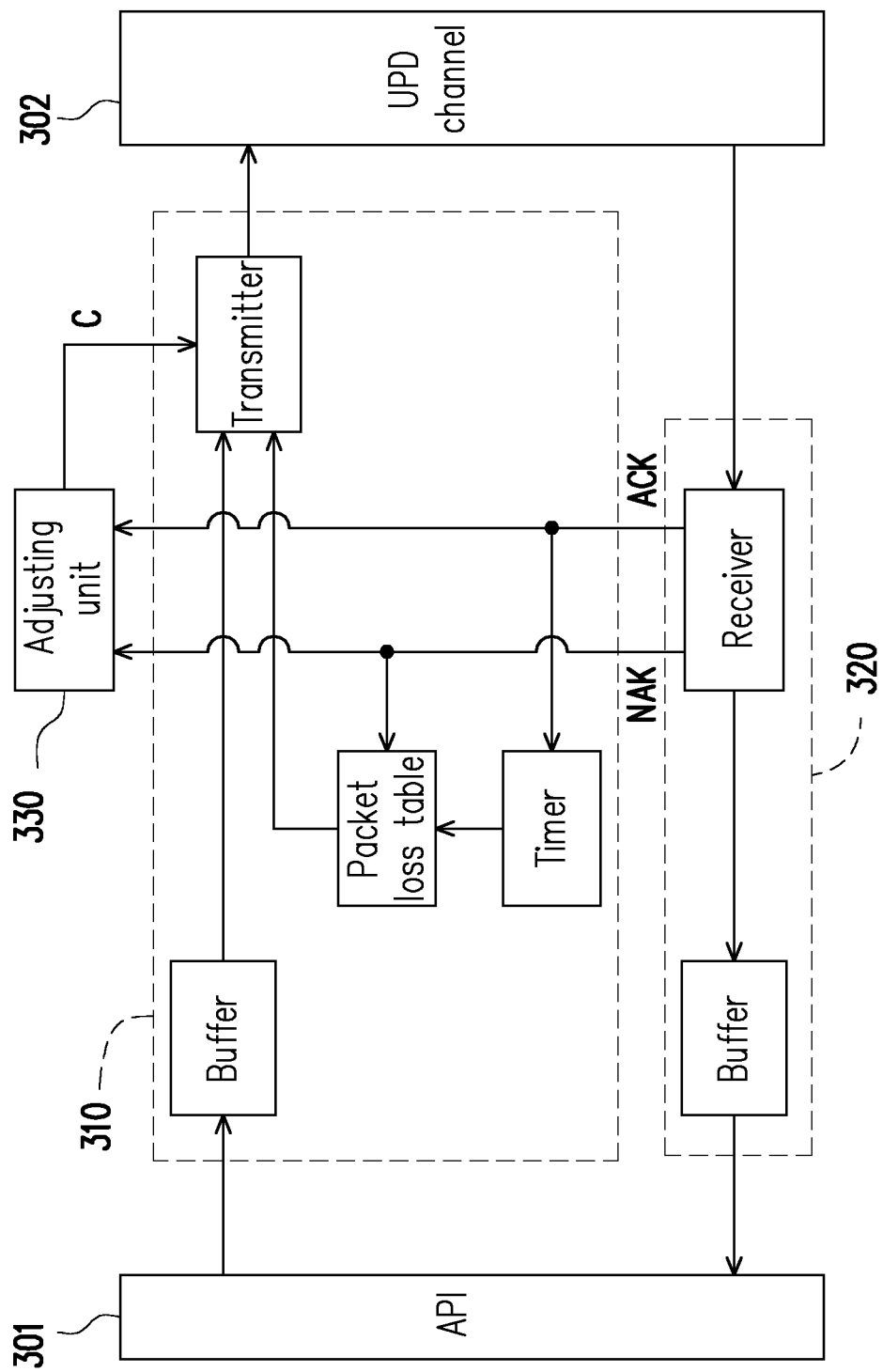
FIG. 3 is a circuit block diagram illustrating a RUDP apparatus according to an embodiment of the invention.

FIG. 3 is a circuit block diagram illustrating a Reliable User Datagram Protocol (RUDP) apparatus 300 according to an embodiment of the invention. The transmitter 110 and/or the receiver 150 shown in FIG. 1 may be derived from related description for the RUDP apparatus 300 shown in FIG. 3. In the embodiment shown in FIG. 3, the RUDP apparatus 300 includes a transmitting unit 310, a receiving unit 320 and an adjusting unit 330. Based on design requirements, the transmitting unit 310, the receiving unit 320 and the adjusting unit 330 may be hardware, software and/or firmware. For instance, in some embodiments, the transmitting unit 310, the receiving unit 320 and/or the adjusting unit 330 may be program codes, and the program codes may be executed by a processor. For instance, in some other embodiments, the transmitting unit 310, the receiving unit 320 and/or the adjusting unit 330 may be program codes, and the program codes may be executed by a processor. In some embodiments, the transmitting unit 310, the receiving unit 320 and/or the adjusting unit 330 may be integrated circuits outside the processor.

The buffer of the transmitting unit 310 can receive to-be-transmitted data from an application program interface (API) 301, and the transmitter of the transmitting unit 310 can output the to-be-transmitted data in batches to a communication network (a UDP channel 302) in accordance with a sliding window parameter C based on RUDP. Accordingly, the to-be-transmitted data may be transmitted to a receiver (e.g., the receiver 150 shown in FIG. 1) via the UDP channel 302. The receiver of the receiving unit 320 can receive the ACK and/or the NAK sent back from the receiver (e.g., the receiver 150 shown in FIG. 1) via the communication network (the UDP channel 302), and download the data outputted from the transmitter (e.g., the transmitter 110 shown in FIG. 1) via the communication network (the UDP channel 302). The receiver of the receiving unit 320 can transmit the downloaded data to the API 301 through the buffer of the receiving unit 320. In some embodiments, detailed UDP operations regarding the API 301, the UDP channel 302, the transmitting unit 310 and the receiving unit 320 may refer to the conventional UDP operations, which are not repeated hereinafter. Unlike the conventional transmitting unit, the sliding window parameter C of the transmitting unit 310 may be dynamically changed.

The adjusting unit 330 is coupled to the transmitting unit 310 to set the sliding window parameter C. The adjusting unit 330 is coupled to the receiving unit 320 to obtain the ACK and/or the NAK. The timer of the transmitting unit 310 can know whether the ACK is timeout. The packet loss table of the transmitting unit 310 can know whether the packet has been lost according to the NAK. The adjusting unit 330 correspondingly adjusts the step value df in accordance with whether the ACK is overtime and in accordance with the difference between the sliding window parameter C and the estimated maximum value MaxWin. The adjusting unit 330 adjusts the sliding window parameter C according to the step value df. Detailed operation of the adjusting unit 330 may be derived from related description for the transmitter 110 shown in FIG. 1 and/or may be derived from related description for FIG. 2, which are not repeated hereinafter.

The adjusting unit 330 adjusts the sliding window parameter C according to a received feedback. When the network congestion occurs, the adjusting unit 330 can dynamically decrease the sliding window parameter C in order to reduce the data packet loss while preventing the same data from being sent multiple times. Meanwhile, when a network packet is lost, the transmitting unit 310 preferentially outputs the lost packet again to the communication network (the UDP channel 302). Because the adjusting unit 330 makes decisions based on the received feedback, the adjusting unit 330 is able to dynamically adjust the sliding window parameter C suitable for the current network condition.

It should be noted that, under different application scenarios, related functions of the transmitter 110, the receiver 150, the RUDP apparatus 300, the transmitting unit 310, the receiving unit 320 and/or the adjusting unit 330 may be implemented as software, firmware or hardware by utilizing common programming languages (e.g., C or C++), hardware description languages (e.g., Verilog HDL or VHDL) or other suitable programming languages. The programming language capable of executing the related functions can be arranged into any known computer-accessible media such as magnetic tapes, semiconductor memories, magnetic disks or compact disks (e.g., CD-ROM or DVD-ROM); or the programming language may be transmitted via the Internet, a wired communication, a wireless communication or other communication mediums. Said programming language may be stored in the computer-accessible media, so that a computer processor can access/execute programming codes of the software (or the firmware). In terms of hardware implementation, the functions disclosed herein may be realized or executed by utilizing various exemplary logics, logical blocks, modules and circuits in one or more controllers, microcontrollers, microprocessors, application-specific integrated circuits (ASIC), digital signal processors (DSP), field programmable gate arrays (FPGA) and/or other processing units in combination with the examples disclosed in the embodiments of the present disclosure. In addition, the device and the method of the invention can also be implemented by a combination of software and hardware.

In summary, the RUDP apparatus and the dynamic adjustment method of the sliding window parameter of RUDP utilizing Fuzzy Rules as proposed by various embodiments of the invention are capable of maintaining a punch-through rate of the original UDP hole punching while enhancing the data transmission reliability of the UDP. By dynamically adjusting the sliding window parameter C of RUDP in accordance with whether the ACK is overtime, the sliding window parameter C can adapt the current network environment. As a result, the RUDP apparatus and the dynamic adjustment method of the sliding window parameter C are capable of effectively using the network bandwidth.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dynamic adjustment method of a sliding window parameter of Reliable User Datagram Protocol (RUDP), comprising:
   correspondingly adjusting a step value by a transmitter in accordance with whether an acknowledgment from a receiver is overtime, and in accordance with a difference between the sliding window parameter and an estimated maximum value; and
   adjusting the sliding window parameter according to the step value.

2. The dynamic adjustment method of the sliding window parameter of RUDP of claim 1, further comprising:
   initializing the step value, the sliding window parameter and the estimated maximum value so as to set the step value to an initial step value, set the sliding window parameter to an initial sliding window value, and set the estimated maximum value to an initial estimated value.

3. The dynamic adjustment method of the sliding window parameter of RUDP of claim 1, wherein the step of adjusting the step value comprises:
   adjusting the step value to a first step value when the acknowledgment received by the transmitter is not overtime and the different falls within a first range; and
   adjusting the step value to a second step value when the acknowledgment received by the transmitter is not overtime and the different falls within a second range.

4. The dynamic adjustment method of the sliding window parameter of RUDP of claim 3, wherein values in the first range are less than values in the second range, and the first step value is less than the second step value.

5. The dynamic adjustment method of the sliding window parameter of RUDP of claim 1, wherein the step of adjusting the sliding window parameter comprises:
   calculating a sum of a window value and the step value, and using the sum as the window value; and
   determining the sliding window parameter according to the window value.

6. The dynamic adjustment method of the sliding window parameter of RUDP of claim 5, wherein the step of determining the sliding window parameter comprises:
   taking an integer part of the window value as the sliding window parameter.

7. The dynamic adjustment method of the sliding window parameter of RUDP of claim 1, further comprising:
   adjusting the sliding window parameter to a preset value when the acknowledgment received by the transmitter is not overtime and the sliding window parameter is an initial sliding window value, wherein the preset value is in response to the estimated maximum value.

8. The dynamic adjustment method of the sliding window parameter of RUDP of claim 7, wherein the preset value is a product of the estimated maximum value and a ratio.

9. The dynamic adjustment method of the sliding window parameter of RUDP of claim 8, wherein the ratio is 1/2.

10. The dynamic adjustment method of the sliding window parameter of RUDP of claim 1, further comprising:
    determining whether to update the estimated maximum value to the sliding window parameter and determining whether to set the sliding window parameter to an initial sliding window value according to a relation between the sliding window parameter and the estimated maximum value when a data packet is lost.

11. The dynamic adjustment method of the sliding window parameter of RUDP of claim 10, wherein the step of determining whether to update the estimated maximum value to the sliding window parameter and determining whether to set the sliding window parameter to the initial sliding window value comprises:
    performing an estimated value updating operation by the transmitter when the acknowledgment is overtime and yet still not received by the transmitter or a negative acknowledgment from the receiver is received by the transmitter, wherein the estimated value updating operation comprises
    updating the estimated maximum value to the sliding window parameter and setting the sliding window parameter to the initial sliding window value when the sliding window parameter is greater than the estimated maximum value.

12. A Reliable User Datagram Protocol (RUDP) apparatus, comprising:
    a transmitting unit, receiving to-be-transmitted data from an application program interface, and output the to-be-transmitted data in batches to a communication network in accordance with a sliding window parameter based on RUDP;
    a receiving unit, receiving an acknowledgment or a negative acknowledgment from a receiver via the communication network; and
    an adjusting unit, coupled to the transmitting unit to set the sliding window parameter, and coupled to the receiving unit to obtain the acknowledgment or the negative acknowledgment, wherein the adjusting unit correspondingly adjusts a step value in accordance with whether the acknowledgment is overtime and in accordance with a difference between the sliding window parameter and an estimated maximum value, and the adjusting unit adjusts the sliding window parameter according to the step value.

13. The RUDP apparatus of claim 12, wherein the adjusting unit initializes the step value, the sliding window parameter and the estimated maximum value so as to set the step value to an initial step value, set the sliding window parameter to an initial sliding window value, and set the estimated maximum value to an initial estimated value in an initialization period.

14. The RUDP apparatus of claim 12, wherein the adjusting unit adjusts the step value to a first step value when the acknowledgment received by the receiving unit is not overtime and the different falls within a first range, and the adjusting unit adjusts the step value to a second step value when the acknowledgment received by the receiving unit is not overtime and the different falls within a second range.

15. The RUDP apparatus of claim 14, wherein values in the first range are less than values in the second range, and the first step value is less than the second step value.

16. The RUDP apparatus of claim 12, wherein the adjusting unit calculates a sum of a window value and the step value, uses the sum as the window value, and determines the sliding window parameter according to the window value.

17. The RUDP apparatus of claim 16, wherein the adjusting unit takes an integer part of the window value as the sliding window parameter.

18. The RUDP apparatus of claim 12, wherein the adjusting unit adjusts the sliding window parameter to a preset value when the acknowledgment received by the receiving unit is not overtime and the sliding window parameter is an initial sliding window value, wherein the preset value is in response to the estimated maximum value.

19. The RUDP apparatus of claim 18, wherein the preset value is a product of the estimated maximum value and a ratio.

20. The RUDP apparatus of claim 19, wherein the ratio is 1/2.

21. The RUDP apparatus of claim 12, wherein the adjusting unit determines whether to update the estimated maximum value to the sliding window parameter and determines whether to set the sliding window parameter to an initial sliding window value according to a relation between the sliding window parameter and the estimated maximum value when a data packet is lost.

22. The RUDP apparatus of claim 21, wherein the adjusting unit performs an estimated value updating operation when the acknowledgment is overtime and yet still not received by the receiving unit or a negative acknowledgment from the receiver is received by the receiving unit, wherein the estimated value updating operation comprises updating the estimated maximum value to the sliding window parameter and setting the sliding window parameter to the initial sliding window value when the sliding window parameter is greater than the estimated maximum value.

* * * * *